(12) United States Patent
Desai et al.

(10) Patent No.: US 7,809,136 B2
(45) Date of Patent: Oct. 5, 2010

(54) ENHANCED ANSI X9.17 AND FIPS 186 PSEUDORANDOM NUMBER GENERATORS WITH FORWARD SECURITY

(75) Inventors: Anand Desai, Menlo Park, CA (US); Yiqun Yin, Old Greenwich, CT (US); Alejandro Hevia, La Jolla, CA (US)

(73) Assignee: NTT DOCOMO, Inc., Tokyo (JP)

( * ) Notice: Subject to any disclaimer, the term of this patent is extended or adjusted under 35 U.S.C. 154(b) by 1246 days.

(21) Appl. No.: 11/371,554

(22) Filed: Mar. 8, 2006

(65) Prior Publication Data

US 2006/0153376 A1    Jul. 13, 2006

Related U.S. Application Data

(62) Division of application No. 10/267,463, filed on Oct. 8, 2002, now Pat. No. 7,227,951.

(60) Provisional application No. 60/344,732, filed on Nov. 6, 2001.

(51) Int. Cl.
*H04L 9/00* (2006.01)
(52) U.S. Cl. .......................... 380/46; 708/250; 708/254
(58) Field of Classification Search .................. 380/46, 380/35, 53, 250, 268, 269, 287, 44, 37, 224; 708/200, 254, 255, 400; 327/164; 331/78
See application file for complete search history.

(56) References Cited

U.S. PATENT DOCUMENTS 7,007,050 B2 *   2/2006   Saarinen ..................... 708/250

OTHER PUBLICATIONS

P. Gatmann, "Software Generation of Practically Strong Random Numbers, In Proceeding of the 7th UNENIX Security Symposium" San Antonio, Texas, Jan. 26-29, 1998.
J. Kelsey, et al. "Cryptanalytic Attacks on Pseudorandom Number Generators, Fast Software Encryption, Fifth International Workshop, LNCS, vol. 1372" Paris, France, Mar. 1998.

* cited by examiner

*Primary Examiner*—Kimyen Vu
*Assistant Examiner*—Chi Nguy
(74) *Attorney, Agent, or Firm*—Haynes and Boone, LLP; Edward C. Kwok

(57) ABSTRACT

Disclosed herein are apparatuses and methods for generating pseudorandom numbers by making the existing ANSI and FIPS PRNGs forward secure and eliminating the need for re-keying them. A forward secure ANSI PRNG is created which includes an enhanced block cipher that is non-invertible even if the key becomes known and a function of the block cipher used in the existing ANSI PRNG. Additionally, the forward secure ANSI PRNG includes an enhanced next state that allows previous states to remain secret even when the key and the current state become known. A forward secure FIPS PRNG is created which includes a computation of an enhanced next state that is noninvertible.

5 Claims, 4 Drawing Sheets

ENHANCED ANSI X9.17 AND FIPS 186 PSEUDORANDOM NUMBER GENERATORS WITH FORWARD SECURITY

RELATED APPLICATIONS

The present application is a division of U.S. patent application Ser. No. 10/267,463 filed on Oct. 8, 2002, now U.S. Pat. No. 7,227,951, which hereby claims priority under 35 U.S.C. §119(e) to provisional U.S. patent application entitled "Security and Efficiency Improvements for the ANSI X9.17 and FIPS 186 Pseudorandom Number Generators," application Ser. No. 60/344,732 filed Nov. 6, 2001, which is incorporated by reference herein.

BACKGROUND

Random numbers or bits are essential for virtually every cryptographic application. For example, seeds for key generation in both secret-key and public-key functions, session keys used for encryption and authentication, salts to be hashed with passwords, and challenges used in identification protocols are all assumed to be random by system designers. However, it is quite expensive to generate truly random numbers. Therefore, most applications rely on a cryptographic mechanism, known as a Pseudorandom Number Generator ("PRNG"), to generate numbers that approximate true random numbers-pseudorandom numbers.

A PRNG, defined in accordance with the relationship: G E=(K, G), includes an iterative process which consists of two functions K and G. Each iteration is indicated by the subscript "i". The seed generation function K takes as input a security parameter k and returns a key K and an initial state $s_0$. For $i \geq 1$, the generation function or transformation G takes as input the key K, the current state $s_{i-n}$ and an auxiliary input $t_i$, and returns a PRNG output $y_i$ and the next state $s_i$. The output $y_i$ is a number, wherein collectively the numbers produced for each iteration "i" is a series of pseudorandom numbers. We refer to the length of the PRNG output in each iteration (the length of each number produced) as the block length of the PRNG which equals $|y_i|$.

PRNGs may be based on a variety of cryptographic primitives. The two most commonly used cryptographic primitives are block ciphers and hash functions. A cipher is a function used for encrypting data. Generally, ciphers use a key (a variable that is combined in some way with the unencrypted data) and a transformation (a formula for combining the key with a string of data) to create a string of pseudorandom numbers. A block cipher is a cipher that breaks up a string of data into shorter strings of data or "blocks" and combines the key with each block to create blocks of pseudorandom numbers.

In contrast, hash functions are functions that take strings of data of any length and return a string of data of some fixed length. Hash functions, when used for pseudorandom number generation, must fulfill certain requirements. The hash function must be hard to invert or "one-way." This means that given the output of the hash function it is computationally infeasible to determine the input data. Additionally, the hash function must be collision intractable. This means that the hash function is a function for which it is computationally infeasible to find any two strings of data that transform to the same output string of data. Additionally, the hash function should be deterministic. This means that no matter how many times the exact same string of data is given, the hash function should produce the exact same output string of data.

One example of a PRNG that uses a block cipher as the underlying primitive is the ANSI X9.17 PRNG (the "ANSI PRNG") as described in ANSI X9.17 (Revised), "American National Standard for Financial Institution Key Management (Wholesale)," America Bankers Association 1985 (hereby incorporated by reference herein). The ANSI PRNG is part of a popular baking standard and was suggested as, a mechanism to generate DES (Data Encryption Standard) keys and nonces. The ANSI PRNG, as defined according to the relationship G $E^F_{ANSI}$=($K_{ANSI}$,$G_{ANSI}$), is based on a block cipher F. FIG. 1 depicts the transformation $G_{ANSI}$ 10. $K_{ANSI}$ (not shown), generates key K and the current state $As_{i-1}$. The key K is used to key the block cipher F, thereby specifying a keyed block cipher $F_K$ 12. $G_{ANSI}$ 10 uses the block cipher $F_K$ 12, the current state $As_{i-1}$ and an auxiliary input $t_i$ to produce the ANSI PRNG output $Ay_i$ and the next state $As_i$ wherein $Ay_i$=$F_K$($As_{i-1} \oplus F_K(t_i)$) and $As_i$=$F_K$($Ay_i \oplus F_K(t_i)$), and wherein "$\oplus$" is an exclusive-or operator.

One example of a PRNG that uses a hash function as the underlying primitive is the FIPS 186 PRNG (the "FIPS PRNG"), as described in FIPS PUB 186-2, (Change Notice 1), "Digital Signature Standard," National Institute of Standards and Technologies, 2001 (hereby incorporated by reference herein). The FIPS PRNG was standardized for generating randomness in DSA (Digital Signature Algorithm). The FIPS PRNG, as defined according to the relationship G $E^H_{FIPS}$=($K_{FIPS}$, $G_{FIPS}$), is based on a hash function H. FIG. 2 depicts the transformation $G_{FIPS}$ 30. $K_{FIPS}$ (not shown), generates key K and the current state $Fs_{i-1}$. The key K is used to key the hash function H, thereby specifying a keyed hash function $H_K$ 32 $G_{FIPS}$ 30 uses the hash function $H_K$ 32 current state $Fs_{i-1}$, and auxiliary input $t_i$ to produce the FIPS PRNG output $Fy_i$ and the next state $Fs_i$, wherein $Fy_i$=$H_K$(($Fs_{i-1}+t_i$) mod $2^n$) and $s_i$=($s_{i-1}+y_i+1$)mod $2^n$, and wherein "⊞" 34 is the operator (a+b)mod $2^n$ (where a and b are inputs to the operator).

A particularly desirable property of PRNGs is forward security. Forward security has been applied to a range of cryptographic problems. A PRNG is said to be forward secure if the compromise of the current state $s_i$ and key K does not enable an attacker to efficiently distinguishing any previously generated output from a truly random sequence of numbers. The ANSI PRNG is clearly not forward secure, because revealing the key K makes the underlying function (the seeded block cipher) $F_K$, and hence the PRNG, completely reversible. In addition, the FIPS PRNG is also not forward secure because if the current state $Fs_{i-1}$ and the output $y_i$ are known, every previous state, going back to the initial state can be determined.

It is common practice to model a PRNG as an iterative process. In each iteration "i", a state ($s_{i-1}$) is input and a random number is output (the PRNG output $y_i$) along with the next state ($s_i$). All states are assumed to be hidden at all times. Although such a model may seem sufficient for theoretical PRNGs, it does not capture all the nuances of a PRNG as it is used in practice. For example, some of the existing models do not model auxiliary inputs such as time stamps or counters that an attacker may be able to control. Furthermore, some state information may be leaked out over time or modified by a user or attacker.

One known method of making a forward secure PRNG out of any generic PRNG based on pseudorandom functions, was suggested by M. Bellare and B. Yee in "Forward Security in Private-Key Cryptography," Cryptology ePrint Archive, Report 2001/035. In general, the disclosed method involves keeping part of the PRNG output secret and using this output to generate a new state and a key for each iteration. Because this known method was targeted for generic PRNGs, it does not necessarily yield the most efficient solution for any specific PRNG (such as the ANSI and FIPS PRNGs). In particular, this known method of creating forward secure PRNGs requires "re-keying" the block cipher for each PRNG iteration, which is an expensive and possibly unnecessary operation. Additionally, the model of PRNGs for which this method is suggested, does not consider auxiliary inputs, which are present in the ANSI and FIPS PRNGs. Auxiliary inputs (such as: keystrokes made by a user, the output of a clock or timer, a timestamp, samples from a low entropy source or other such inputs) are a common feature in practical PRNGs since they are a method of injecting something random into the PRNG at regular intervals and to prevent repeated seeds (keys and initial states) from causing repeated outputs.

BRIEF SUMMARY

Disclosed herein are apparatuses and methods for generating forward secure pseudorandom numbers that overcome the shortcomings of the prior art. Both the apparatuses and methods improve upon the existing ANSI and FIPS PRNGs by making them forward secure and eliminating the need for re-keying.

In improving the existing ANSI PRNG, a forward secure ANSI PRNG is created. This forward secure ANSI PRNG includes an enhanced block cipher which is a function of the block cipher used in the existing ANSI PRNG. This enhanced block cipher is non-invertible even if the key becomes known. Additionally, the forward secure ANSI PRNG includes an enhanced next state that is computed in way that allows previous states to remain secret even when the key and the enhanced next state become known. In improving the existing FIPS PRNG, a forward secure FIPS PRNG is created.

A method of making the ANSI PRNG forward secure is to replace the block cipher and the computation of the next state of the known ANSI PRNG. The block cipher may be replaced by an enhanced block cipher which is non-invertible even if the key becomes known. The computation of the next state may be replaced by one which computes an enhanced next state that allows previous states to remain secret even when the key and the current state become known. This method also includes redefining the output of the ANSI PRNG to reflect the enhanced block cipher, the enhanced next state and any auxiliary inputs. A method of making the FIPS PRNG forward secure includes replacing the computation of the next state of the FIPS PRNG with a non-invertible computation of an enhanced next state and redefining the output of the FIPS PRNG to reflect the enhanced next state and any auxiliary inputs.

Described herein are numerous embodiments, which will be understood by those skilled in the art based on the present disclosure. Some of these are described below and are represented in the drawings by means of several figures, in which:

DETAILED DESCRIPTION

Figure 1:
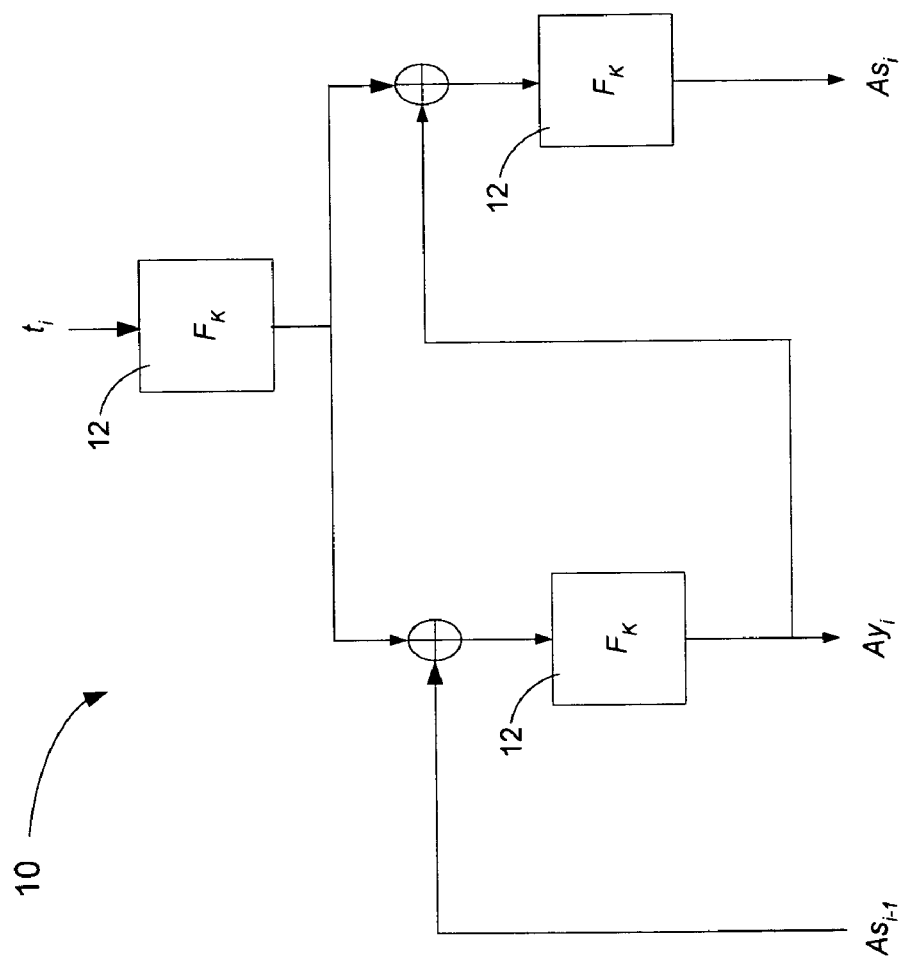
FIG. 1 is a diagram of an iteration of a known ANSI PRNG.
Figure 2:
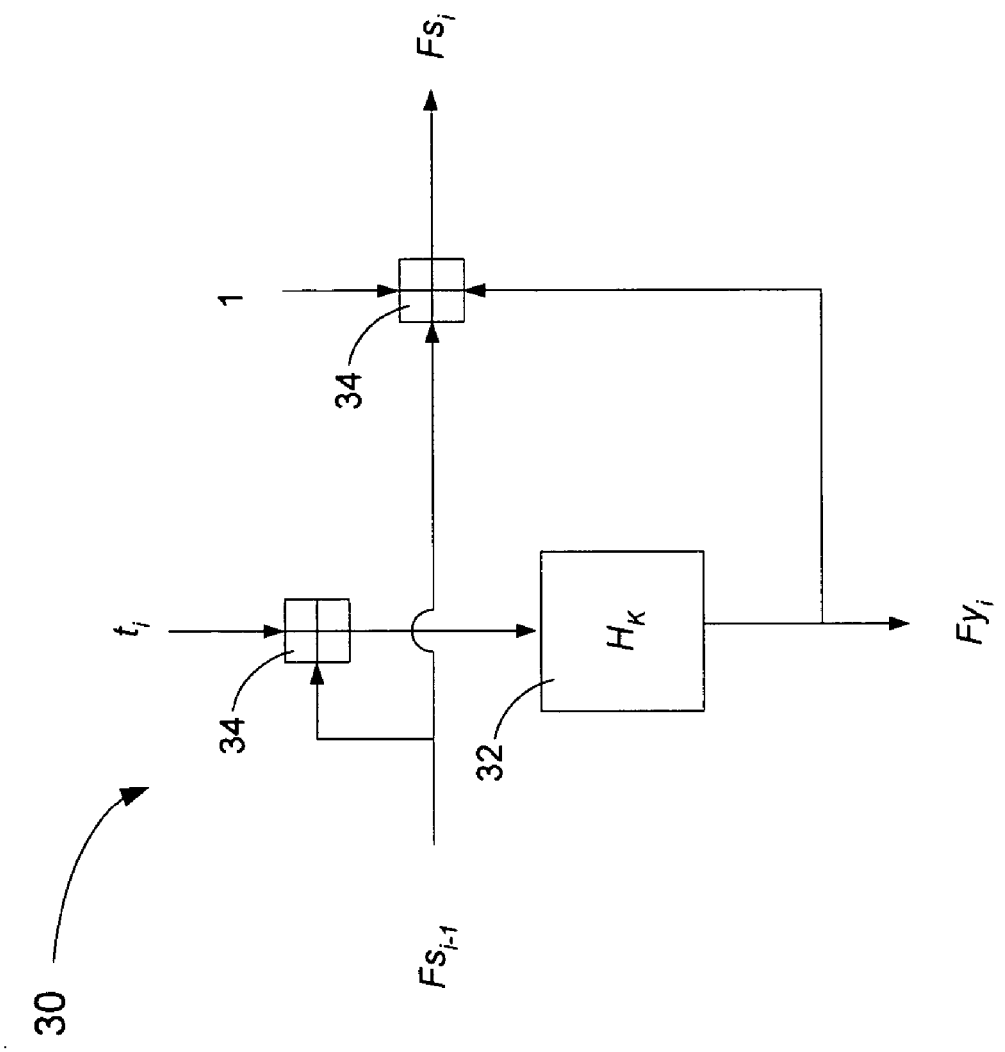
FIG. 2 is a diagram of an iteration of a known FIPS PRNG.

Methods and apparatuses for generating PRNGs with enhanced security are disclosed herein (each an "enhanced PRNG"). The apparatuses for generating enhanced PRNGs in some embodiments include a processor and an input device. The processor is any mechanical, electrical, electronic or electromagnetic apparatus, or the like, capable of performing the calculations, computations, definitions, determinations and the like specified herein. Additionally, such a processor may also be used to implement the methods described herein. The processor may be operated in conjunction with a storage device such as a semiconductor memory for storage of program code and data for operating the processor. The input device is one or more devices that enable auxiliary inputs such as, time-stamps, the output of a clock or timer, key strokes, samples from a low entropy source, and the like, to be created or received at the enhanced PRNG and subsequently forwarded to the processor. The enhanced PRNGs are based on the known ANSI PRNG and the FIPS PRNG and are based on several assumptions. For example, in the enhanced PRNGs, as in the known ANSI and FIPS PRNGs, the transformation for the enhanced PRNG G' will take as inputs a key "K", an auxiliary input "$t_i$", and a current state "$s_{i-1}$," for each iteration "i". From this, the transformation G' will generate two outputs: a PRNG output "$y'_i$," and a new state "$s'_i$".

Other embodiments for generating PRNGs include computer readable software code. Such code may be stored on a computer readable storage medium or encoded in a computer readable electrical signal. The code may be object code or any other code describing or controlling the functionality described herein. The computer readable storage medium may be a magnetic storage disk such as a floppy disk, an optical disk such as a CD-ROM, semiconductor memory or any other physical object storing program code or associated data. Similarly, the electrical signal may be any electrical signal conveying data including the program code and may be communicated by wireline, such as over a network, local area network or by Internet, or wirelessly.

Underlying the methods and apparatuses disclosed herein are the following assumptions: state information may be leaked over time or even modified, different functions are to be treated differently, the underlying functions used to generate the enhanced PRNG are finite pseudorandom functions, the enhanced PRNG will have the on-line property (the enhanced PRNG is able to generate the output $y'_i$ and next state $s'_i$ before the next auxiliary input "$t_{i+1}$" is known) and that the key generating function K has access to a suitable level of randomness, which means that the key K and the initial state $s_o$ will also be sufficiently random. Further, it is assumed that pseudorandomness roughly means that from the point of view of an attacker, the PRNG output should be indistinguishable from a truly random sequence.

The first step towards making the ANSI PRNG forward secure is to make the underlying function $F_K$ non-invertible even when the key K is revealed. This can be done by replacing the underlying function $F_K$ of the known ANSI PRNG with the function $F'_K$ (the "enhanced keyed block cipher"), where for all inputs x, $F'_K(x)$ is defined according to the relationship: $F'_K(x)=F_K(x)\oplus x$. However, this step alone is not enough to make the ANSI PRNG forward secure, as it is possible for an attacker to indirectly invert the current state $As_{i-1}$ knowing the previous output and auxiliary input such as a time stamp. Therefore, the next state $As_i$, must be computed in such a way that allows the states that occur during iterations that precede the next state $As_i$ (collectively the "previous states") to remain secret even when the key and the next state are known. One way to accomplish this is to replace the next state used in the known ANSI PRNG $As_i$ with a next state $As'_i$ defined according to the relationship: $As'_i = F'_K(As_{i-1})$, wherein $F'_K(As_{i-1})$ is defined according to the relationship $F'_K(As_{i-1}) = F_K(As_{i-1}) \oplus As_{i-1}$ and $As_{i-1}$ is the current state.

Figure 3:
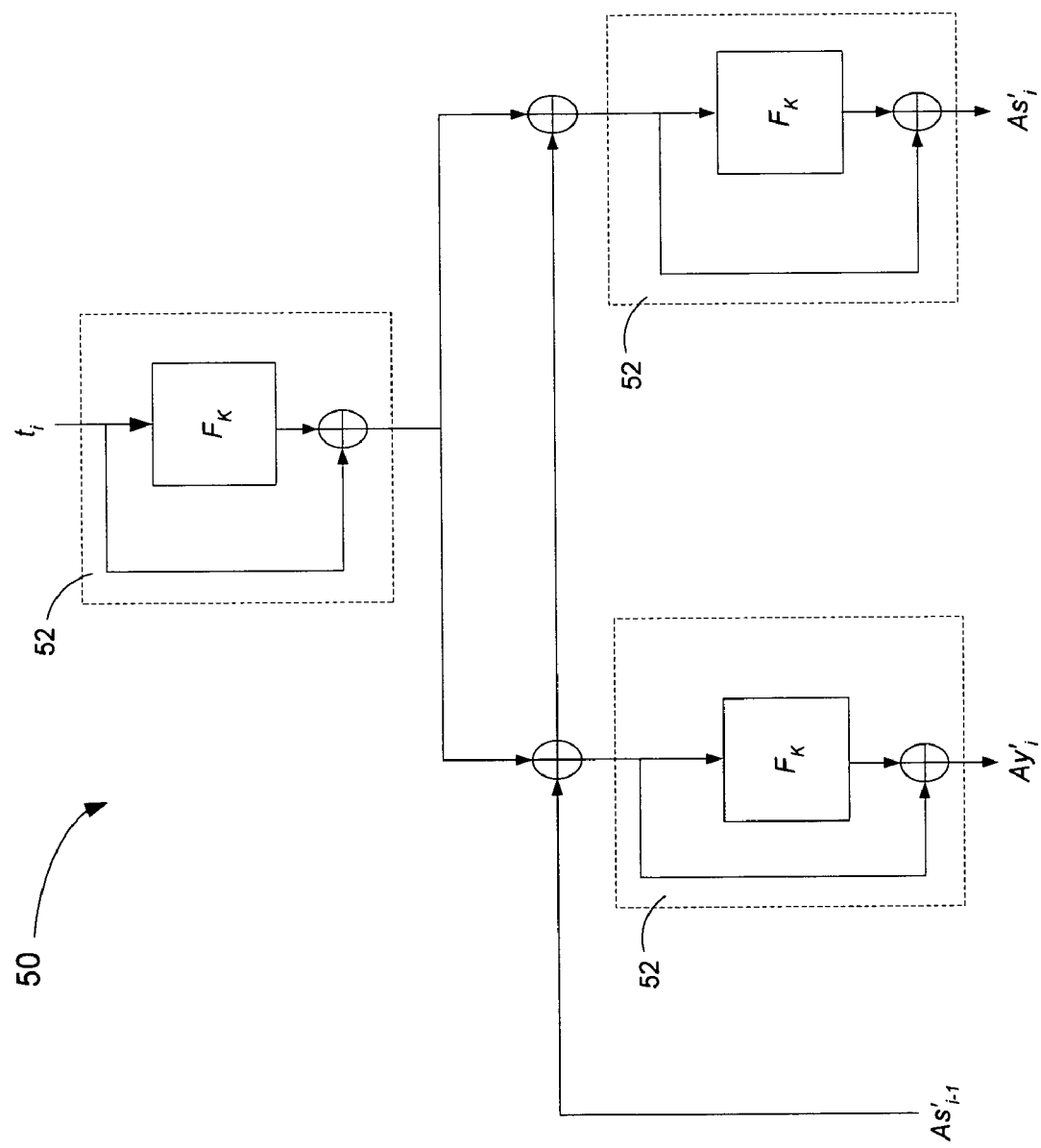
FIG. 3 is a diagram of an iteration of an embodiment of an enhanced ANSI PRNG.

FIG. 3 generally depicts the transformation for the enhanced ANSI PRNG ("$G'_{ANSI}$") 50. $K_{ANSI}$ (not shown), generates key K and the initial state $As_0$. The key K is used to seed the enhanced block cipher F', where for all inputs x, $F'_K(x)$ 52 is defined according to the relationship: $F'_K(x) = F_K(x) \oplus x$, thereby specifying an enhanced keyed block cipher $F'_K$ 52. $G'_{ANSI}$ 50 uses the enhanced seeded block cipher $F'_K$ 52 to produce an enhanced PRNG output $Ay'_i$ and an enhanced next state $As'_i$ wherein $Ay'_i$ is defined according to the relationship $Ay'_i = F'_K(F'_K(t_i) \oplus As'_{i-1})$. $As'_i$ is defined according to the relationship $As'_i = F'_K(As'_{i-1})$.

Turning now to the FIPS PRNG, in order to make the FIPS PRNG forward secure, the computation of the next state $Fs_i$ (also called the "state update function") must be modified to be non-invertible. One way of doing this is to replace the next state of the known FIPS PRNG $Fs_i$ with an enhanced next state defined in accordance with the relationship: $Fs'_i = (H_K((Fs_{i-1} + Fy'_i + 1 + t_i) \bmod 2^n) + Fs_{i-1} + Fy'_i + 2) \bmod 2^n)$ where H is the same hash function as in the original FIPS PRNG and "n" is the block length of the enhanced PRNG output $Fy'_i$ (the "PRNG block length"). This results in an enhanced PRNG output defined in accordance with the relationship $Fy'_i = H_K((Fs_{i-1} + t_i) \bmod 2^n)$. One of skill in the art will recognize that there are other possible state update functions. However, the method suggested herein has the advantage that in order to implement it, only minimal changes to existing hardware and software implementing the known FIPS PRNG are required. This follows from the observation that the computation of the PRNG output and the enhanced next state in an iteration of the enhanced FIPS PRNG can be obtained directly from two iterations of the FIPS PRNG. The output of the enhanced FIPS PRNG is the output of the first iteration of the FIPS PRNG. The enhanced next state of the enhanced FIPS PRNG is the next state of the second iteration of the FIPS PRNG.

Figure 4:
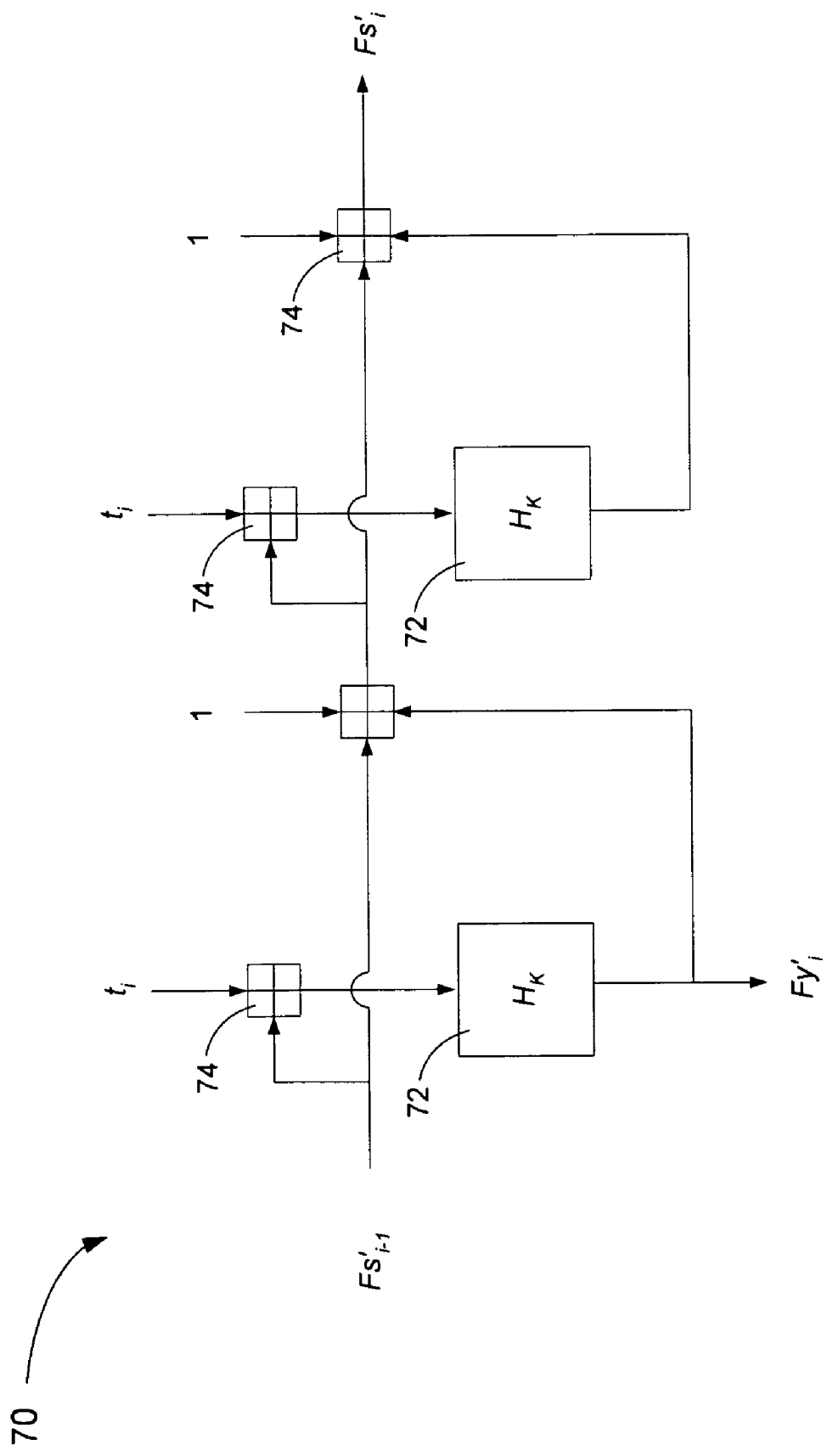
FIG. 4 is a diagram of an iteration of an embodiment of an enhanced FIPS PRNG.

FIG. 4 generally depicts the transformation for the enhanced FIPS PRNG $G'_{FIPS}$ 70. $K_{FIPS}$ (not shown), generates key K and the current state $Fs_{i-1}$. The key K is used to key the hash function H, thereby specifying a keyed hash function $H_K$ 72. $G'_{FIPS}$ 70 uses the hash function $H_K$ 72 to produce the enhanced FIPS PRNG output $Fy'_i$ and the next state $Fs'_i$, wherein $Fy'_i$ is defined according to the relationship $Fy'_i = H_K((Fs'_{i-1} + t_i) \bmod 2^n)$ and wherein $Fs'_i$ is defined according to the relationship $Fs'((H_K((Fs'_{i-1} + Fy'_i + 1 t_i) \bmod 2^n) + Fy'_{i-1} + Fy'_i + 2) \bmod 2^n)$ where H is the same hash function as in the original FIPS PRNG and "⊞" 74 is the operator $(a+b+c) \bmod 2^n$, wherein "n" is the PRNG block length and "a", "b", and "c" are inputs to the operator. Those ordinarily skilled in the art will recognize that there are other equivalent relationships that can define $H'_K(x)$, $Fy'_i$ and $Fs'_i$, respectively.

Altering the ANSI PRNG and the FIPS PRNG can be used as a method for producing pseudorandom numbers. Altering the ANSI PRNG generally includes replacing the underlying primitive (keyed block cipher) $F_K$ with a noninvertible enhanced keyed block cipher $F'_K$ and replacing the next state $As_i$ with a value ("$As'_i$") that allows previous states to remain secret even if the key AK and the current state $As'_i$ become known. Replacing $F_K$ with $F'_K$ generally includes defining $F'_K$ as a function of the block cipher $F_K$ and the key AK. Defining $F'_K$ includes defining $F'_K$ according to the relationship $F'_K(x) = F_K(x) \oplus x$ for all inputs "x". Replacing the next state with $As'_i$ includes defining $As'_i$ as a function of the current state $As_{i-1}$ according to the relationship $As'_i = F'_K(As_{i-1})$, where $F'_K(As_{i-1})$ is defined according to the relationship $F'_K(As_{i-1}) = F_K(As_{i-1}) \oplus As_{i-1}$. The method further involves defining the enhanced PRNG output $Ay'_i$ according to the relationship $Ay'_i = F'_K(F'_K(t_i) \oplus As_{i-1})$.

Altering the FIPS PRNG generally includes replacing the next state $Fs_i$ with a non-invertible next state (the "enhanced next state $Fs'_i$). Replacing $Fs_i$ with $Fs'_i$ generally includes defining $Fs'_i$ as a function of the current state $Fs_{i-1}$ and the hash function H of the original FIPS PRNG. Replacing $Fs_i$ with $Fs'_i$ further includes defining $Fs'_i$ according to the relationship $Fs'_i = ((H_K((Fs'_{i-1} + Fy'_i + 1 + t_i) \bmod 2^n) + Fs'_{i-1} + Fy'_i + 2) \bmod 2^n)$. The method further involves defining an enhanced PRNG output $Fy'_i$ wherein $Fy'_i$ is defined according to the relationship $Fy'_i = H_K((Fs_{i-1} + t_i) \bmod 2^n)$.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawings and descriptions in this disclosure are proffered to facilitate comprehension of the invention and should not be construed to limit the scope thereof.

We claim:

1. A forward secure pseudorandom number generator, comprising:
   a processor;
   a seeded hash function $H_K$;
   an iteration integer i, $i \geq 1$;
   an enhanced next state $Fs'_i$ provided by the processor for each iteration integer i, wherein the enhanced next state $Fs'_i$ is non-invertible;
   an enhanced pseudorandom number generator output $Fy'_i$ provided by the processor for each iteration integer i, the enhanced pseudorandom number generator output $Fy'_I$ having a block length n, wherein the enhanced pseudorandom number generator output $Fy'_i$ is calculated by the processor and is a function of at least one auxiliary input $t_i$; and
   an input device, wherein the at least one auxiliary input $t_i$ is received by the processor via the input device, $Fy'_i = H_K((Fs'_{i-1} + t_i) \bmod 2^n)$, and $Fs'_i = ((H_K((Fs'_{i-1} + Fy'_i + 1 + t_i) \bmod 2^n) + Fs'_{i-1} + Fy'_i + 2) \bmod 2^n)$.

2. A forward pseudorandom number generator, as claimed in claim 1, further comprising a pseudorandom number generator block length n, $n = |Fy'_i|$.

3. A forward secure pseudorandom number generator, comprising:
   a seed generating function $K_{FIPS}$;
   a processor, wherein the processor, using the seed generating function $K_{FIPS}$, returns at least one key K and an initial state $Fs_0$;
   a keyed hash function $H_K$;
   an iteration integer i, $i \geq 1$;
   an input device;
   at least one auxiliary input $t_i$ for each iteration integer i, wherein the at least one auxiliary input $t_i$ is received by the processor via the input device;
   an enhanced current state $Fs'_{i-1}$ for each iteration integer i;
   an enhanced pseudorandom generator output $Fy'_i$ for each iteration integer i;
   a pseudorandom number generator block length n, $n = |Fy'_i|$, $Fy'_i = H_K((Fs'_{i-1} + t_i) \bmod 2^n)$; and an enhanced next state $Fs'_i$ for each iteration integer i, wherein the enhanced next state $Fs'_i$ is calculated by the processor, $Fs'_i=((H_K((Fs'_{i-1}+Fy'_i+1+t_i)\bmod 2^n)+Fs'_{i-1}+Fy'_i+2)\bmod 2^n)$.

4. A non-transitory computer readable medium encoding program code for implementing a forward secure pseudorandom number generator, comprising:

a first program code implementing a keyed hash function $H_K$;

data encoding an iteration integer i, $i \geq 1$;

a second program code implementing an enhanced next state $Fs'_i$ for each iteration integer i, wherein the enhanced next state $Fs'_i$ is non-invertible; and a third program code implementing an enhanced pseudorandom number generator output $Fy'_i$ for each iteration integer i, the enhanced pseudorandom number generator output $Fy'_I$ having a block length n, wherein the enhanced pseudorandom number generator output $Fy'_i$ is a function of at least one auxiliary input $t_i$, and wherein $Fy_i'=H_K((Fs'_{i-1}+t_i)\bmod 2^n)$, and $Fs'_i=((H_K((Fs'_{i-1}+Fy'_i+1t_i)\bmod 2^n)+Fs'_{i-1}+Fy'_i+2)\bmod 2^n)$.

5. A method for producing pseudorandom numbers, comprising:

replacing a next state $Fs_i$ in a pseudorandom number generator that is implemented by digital circuitry by an enhanced next state $Fs'_i$, i being an iteration integer not less than 1, wherein the generation of the enhanced next state $Fs'_i$ is non-invertible, the enhanced next state $Fs'_i$ being a function of a keyed hash function $H_K$ and an enhanced current state $Fs'_{i-1}$; and providing:

an iteration integer i, $i \geq 1$;

an auxiliary input $t_i$ for each iteration integer i;

an enhanced pseudorandom number generator output $Fy'_i$ for each iteration integer i; and a pseudorandom number generator block length n, $n=|Fy'_i|$, wherein $Fs'_i=((H_K((Fs'_{i-1}+Fy'_i+1+t_i)\bmod 2^n)+Fs'_{i-1}+Fy'_i+2)\bmod 2^n)$; and $Fy'_i=H_K((FS'_{i-1}+t_i)\bmod 2^n)$.

* * * * *